US010053210B2

(12) United States Patent
Necci

(10) Patent No.: US 10,053,210 B2
(45) Date of Patent: Aug. 21, 2018

(54) AIRCRAFT UNDERCARRIAGE INCLUDING A TELESCOPIC LINEAR ROD

(71) Applicant: MESSIER-BUGATTI-DOWTY, Velizy Villacoublay (FR)

(72) Inventor: Carlo Necci, Velizy-Villacoublay (FR)

(73) Assignee: MESSIER-BUGATTI-DOWTY, Vélizy-Villacoublay (FR)

( * ) Notice: Subject to any disclaimer, the term of this patent is extended or adjusted under 35 U.S.C. 154(b) by 167 days.

(21) Appl. No.: 15/045,328

(22) Filed: Feb. 17, 2016

(65) Prior Publication Data

US 2016/0236771 A1    Aug. 18, 2016

(30) Foreign Application Priority Data

Feb. 18, 2015   (FR) ...................................... 15 51371

(51) Int. Cl.
| B64C 25/14 | (2006.01) |
| B64C 25/34 | (2006.01) |
| B64C 25/50 | (2006.01) |
| B64C 25/62 | (2006.01) |
| B64C 25/58 | (2006.01) |
| F16F 6/00 | (2006.01) |

(52) U.S. Cl.
CPC .............. B64C 25/34 (2013.01); B64C 25/50 (2013.01); B64C 25/58 (2013.01); B64C 25/62 (2013.01); F16F 6/00 (2013.01)

(58) Field of Classification Search
CPC ......... B64C 25/34; B64C 25/50; B64C 25/58; B64C 25/62; B64C 25/14; B64C 25/10; B64C 2025/125; B64C 25/12; B64C 25/20; F16F 15/03; F16F 6/005; F16F 7/00; F16F 9/00; F16F 6/00; B60G 17/0157; B60G 17/06; B60G 13/02; B60G 13/14; B60G 15/00; B60G 2202/42; B60G 2400/202; B60G 2600/26; H02K 41/031; H02K 49/043
See application file for complete search history.

(56) References Cited

U.S. PATENT DOCUMENTS

| 2,636,139 | A | * | 4/1953 | Winget | .................... | F16F 15/18 |
| | | | | | | 310/105 |
| 2,906,899 | A | * | 9/1959 | Geneslay | ................... | H01F 7/02 |
| | | | | | | 188/267 |

(Continued)

FOREIGN PATENT DOCUMENTS

| DE | 903303 C | 2/1954 |
| DE | 102011113918 A1 | 3/2013 |

(Continued)

*Primary Examiner* — Medhat Badawi
(74) *Attorney, Agent, or Firm* — Sughrue Mion, PLLC

(57) ABSTRACT

An aircraft undercarriage comprising a telescopic linear rod (0, 0', 0") comprising first and second sliding rod portions. The undercarriage further comprises:
- a first permanent magnet set (1a, 1a', 1a") fastened to the first rod portion (1, 1', 1"); and
- a second permanent magnet set (2a, 2a', 2a") fastened to the second rod portion (2, 2', 2");
- the first and second permanent magnet sets (1a, 1a', 1a", 2a, 2a', 2a") generating a magnetic repulsion force between the first rod portion (1, 1', 1") and the second rod portion (2, 2', 2") and maintaining a first annular space (E1) between the first rod portion and the second rod portion.

8 Claims, 7 Drawing Sheets

(56) References Cited

U.S. PATENT DOCUMENTS

| | | | | |
|---|---|---|---|---|
| 3,493,905 A * | 2/1970 | Foulke | F16F 15/03 | 310/103 |
| 3,559,027 A * | 1/1971 | Arsem | B60G 13/14 | 180/65.31 |
| 3,770,290 A * | 11/1973 | Bottalico | B60G 13/14 | 188/164 |
| 4,396,170 A * | 8/1983 | Turiot | F16F 9/54 | 188/321.11 |
| 4,698,470 A * | 10/1987 | Milianowicz | F16F 15/03 | 188/267 |
| 4,796,430 A * | 1/1989 | Malaker | F02G 1/043 | 62/6 |
| 4,969,662 A * | 11/1990 | Stuart | B60G 11/00 | 188/267 |
| 5,053,662 A * | 10/1991 | Richter | F01D 25/04 | 290/40 A |
| 5,120,030 A * | 6/1992 | Lin | F16F 6/00 | 188/267 |
| 5,283,234 A * | 2/1994 | Wang | F41B 6/00 | 188/267 |
| 5,392,881 A * | 2/1995 | Cho | F16F 15/035 | 188/267 |
| 6,019,495 A * | 2/2000 | Yamada | B60G 17/0152 | 280/5.515 |
| 6,035,980 A * | 3/2000 | Fujita | F16F 6/005 | 188/267 |
| 6,060,804 A * | 5/2000 | Fujita | B06B 1/045 | 310/12.19 |
| 6,084,329 A * | 7/2000 | Fujita | F16F 15/03 | 248/566 |
| 6,105,943 A * | 8/2000 | Nagasawa | F16F 13/264 | 267/140.14 |
| 6,232,689 B1 * | 5/2001 | Fujita | F16F 6/005 | 310/103 |
| 6,405,841 B1 * | 6/2002 | Zeno | F16F 15/03 | 188/267 |
| 6,640,940 B2 * | 11/2003 | Carlson | B62D 5/006 | 180/400 |
| 7,308,975 B2 * | 12/2007 | Nehl | B60G 17/01933 | 188/267 |
| 7,637,360 B2 * | 12/2009 | Carlson | A47C 1/03 | 188/267.2 |
| 7,762,248 B1 * | 7/2010 | Squire | F41B 11/00 | 124/80 |
| 8,006,680 B1 * | 8/2011 | Squire | F41B 11/723 | 124/49 |
| 8,253,281 B2 * | 8/2012 | Namuduri | H02K 7/1876 | 310/12.14 |
| 8,614,518 B2 * | 12/2013 | Li | B60G 17/019 | 290/1 R |
| 8,793,052 B2 * | 7/2014 | Inoue | B60G 17/0157 | 188/297 |
| 9,428,024 B2 * | 8/2016 | Park | B60G 15/04 | |
| 2002/0003327 A1 * | 1/2002 | Enoki | F16F 6/005 | 267/136 |
| 2002/0017749 A1 * | 2/2002 | Fujita | F16F 3/026 | 267/140.15 |
| 2005/0016802 A1 * | 1/2005 | Akami | F16F 9/3207 | 188/267 |
| 2007/0039791 A1 * | 2/2007 | Krefeld | F16F 9/48 | 188/316 |
| 2007/0175716 A1 * | 8/2007 | Kim | B60G 13/14 | 188/267 |
| 2008/0164111 A1 * | 7/2008 | Inoue | B60G 15/065 | 188/297 |
| 2013/0025986 A1 * | 1/2013 | Lee | H02K 41/031 | 188/267 |
| 2013/0127175 A1 * | 5/2013 | Zuo | B60G 17/06 | 290/1 A |
| 2013/0319803 A1 * | 12/2013 | Lee | F16F 6/00 | 188/267 |
| 2014/0015180 A1 * | 1/2014 | Pepka | F16F 6/005 | 267/195 |
| 2015/0167769 A1 * | 6/2015 | Lee | F16F 6/005 | 188/267 |
| 2015/0167770 A1 * | 6/2015 | Trangbaek | F16F 6/005 | 280/5.508 |
| 2015/0231942 A1 * | 8/2015 | Trangbaek | F16F 15/03 | 267/195 |
| 2017/0113788 A1 * | 4/2017 | Essinger | B64C 25/405 | |
| 2017/0129594 A1 * | 5/2017 | Essinger | B64C 25/405 | |

FOREIGN PATENT DOCUMENTS

| | | |
|---|---|---|
| EP | 0391066 A1 | 10/1990 |
| GB | 1530918 A | 11/1978 |

* cited by examiner

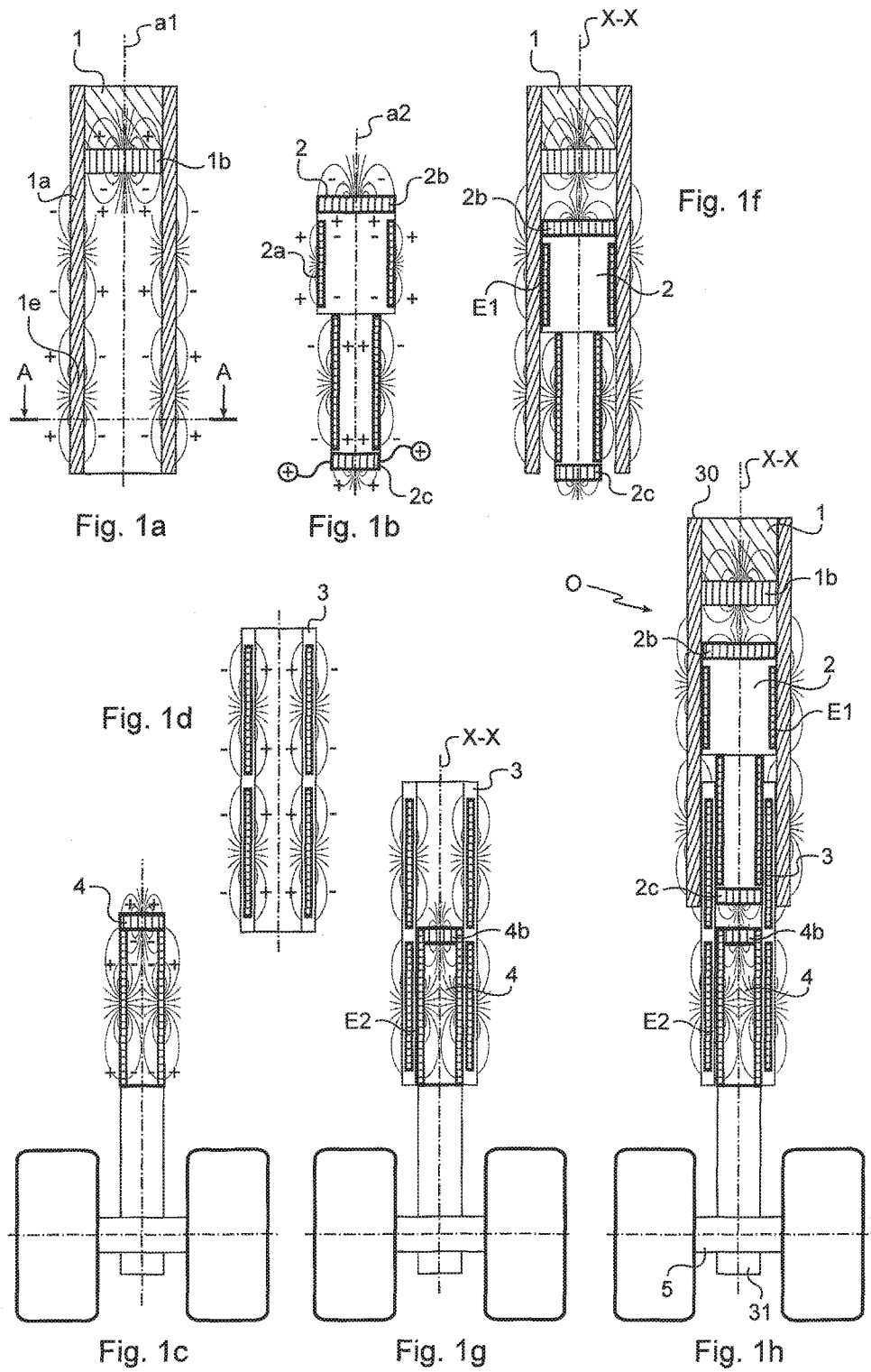

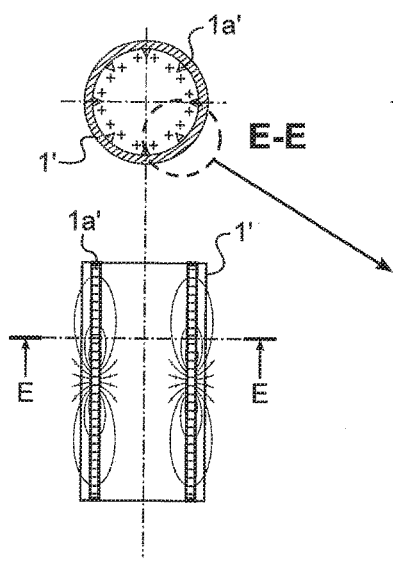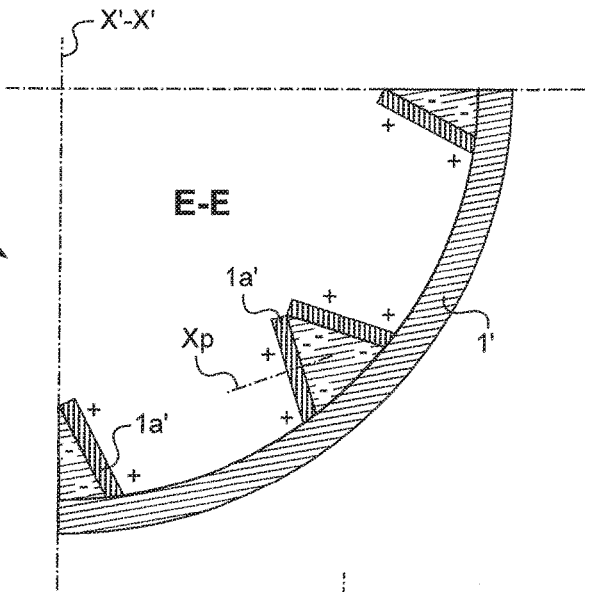
Fig. 2b
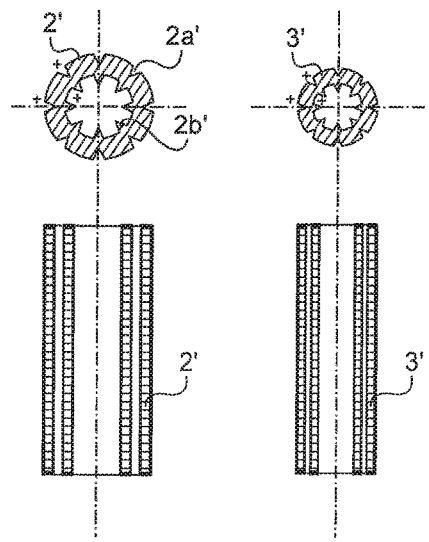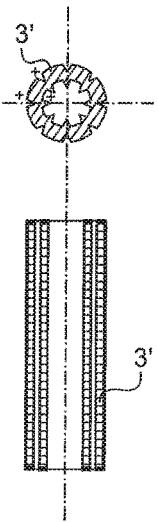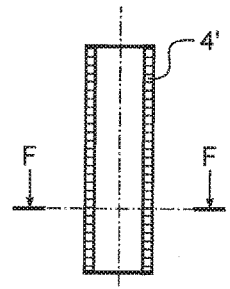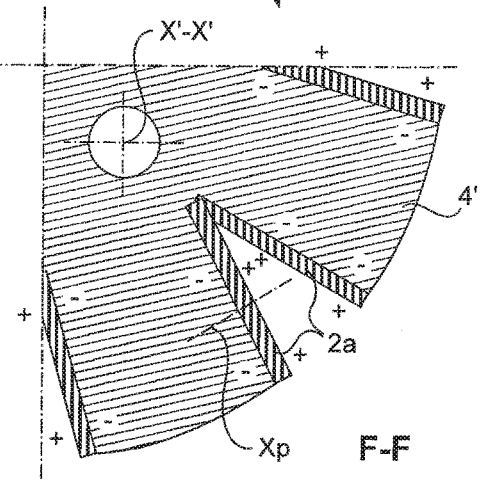
Fig. 2c  Fig. 2d  Fig. 2e

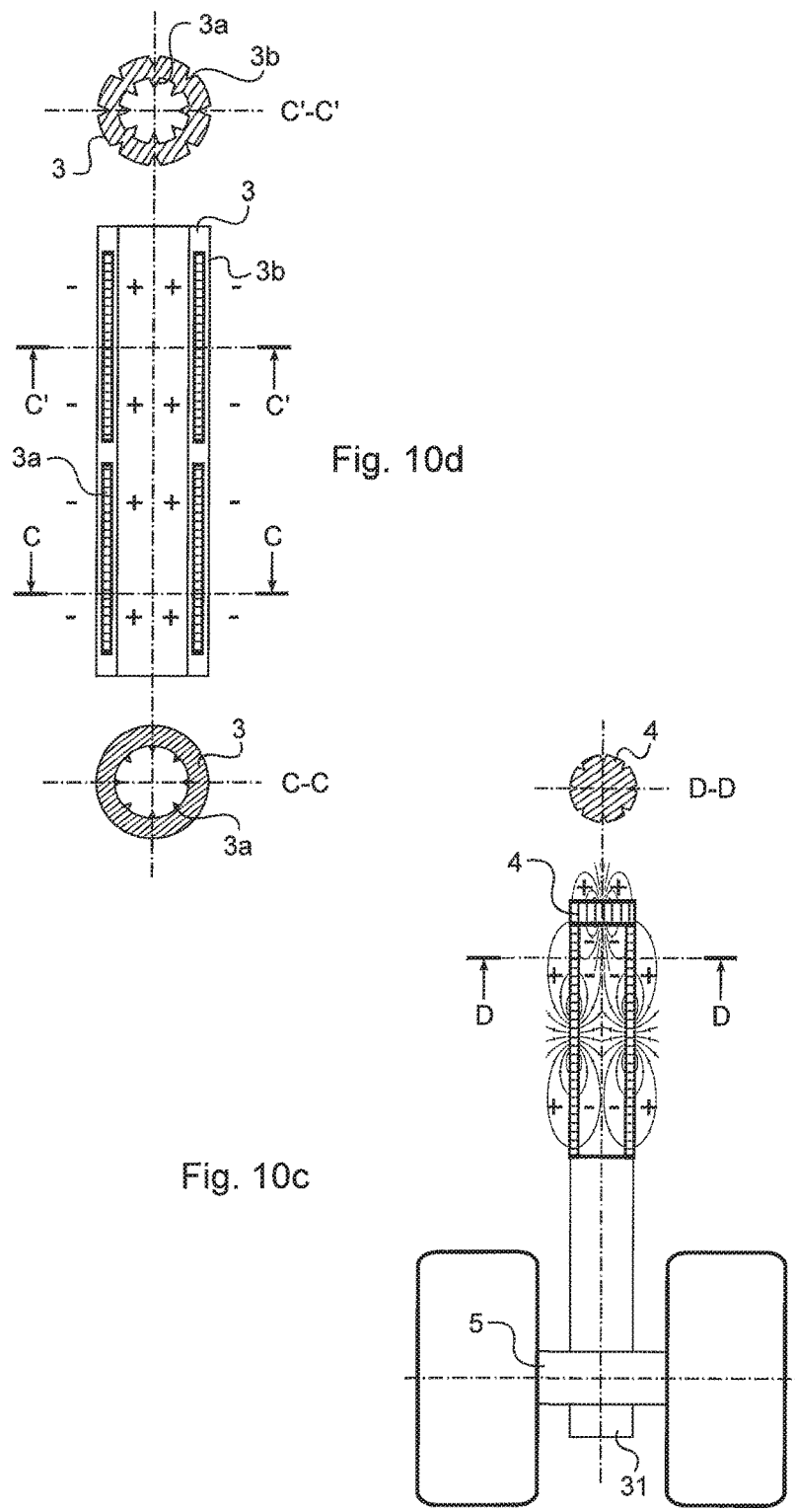

AIRCRAFT UNDERCARRIAGE INCLUDING A TELESCOPIC LINEAR ROD

FIELD OF THE INVENTION

The invention relates essentially to the field of aircraft undercarriages, and in particular to an undercarriage including a telescopic linear rod, i.e. a telescopic rod that is capable of extending or retracting along a main axis of the rod.

PRIOR ART

Document WO 2013/117902 (A1) discloses an aircraft undercarriage including a telescopic linear rod extending between a first rod end having means for attaching the rod to a main structure of the aircraft and a second rod end carrying a wheel axle of the undercarriage. That telescopic linear rod comprises rod portions adapted to slide relative to one another along a main axis of symmetry of the rod in order to extend or retract the telescopic rod.

The relative position between those first and second rod portions of the prior art is determined by means of a hydraulic shock absorber associated with a scissors linkage for preventing relative rotation between the first and second rod portions. Because of the presence of the scissors linkage, such an undercarriage may present considerable weight.

OBJECT OF THE INVENTION

An object of the present invention is to provide an alternative aircraft undercarriage.

SUMMARY OF THE INVENTION

In order to achieve this object, the invention proposes an aircraft undercarriage including a telescopic linear rod extending between a first rod end having means for attaching the rod to a main structure of the aircraft and a second rod end carrying a wheel axle of the undercarriage, the telescopic linear rod comprising rod portions adapted to slide in one another along a main axis of symmetry of the rod in order to extend or retract the telescopic rod.

This undercarriage of the invention is essentially characterized in that it further comprises:
  a first permanent magnet set fastened to a first of said rod portions; and
  a second permanent magnet set fastened to a second of said rod portions;
  the first and second permanent magnet sets being arranged so as to generate a magnetic repulsion force between the first rod portion and the second rod portion and in such a manner as to maintain a first annular space extending around one of the first or second rod portions and situated between the first rod portion and the second rod portion.

The term "annular space" is used to describe a peripheral volume surrounding one of said first and second rod portions and situated between said rod portions. By way of example, this definition of "annular space" covers a hollow cylindrical space, or a star-shaped peripheral space as appears in the embodiments shown by the figures below.

By means of this invention, the relative sliding between the first and second rod portions is guided using a magnetic repulsion force between the slidable first and second portions of the telescopic rod, thereby opposing contact between these first and second rod portions.

This contactless guidance minimizes wear associated with friction between the sliding portions of the telescopic rod and makes it possible to avoid using lubricants.

The invention thus makes it possible to omit friction bearings and friction gaskets for guiding the relative linear sliding between the rod portions. Naturally, such bearings may be used in combination with the magnetic guide means but for the purpose of providing mechanical guidance by friction only in the event of the first and second rod portions being subjected to mechanical forces that are too great and that exceed a predetermined maximum acceptable force. Thus, so long as the rod is subjected to a force below said predetermined maximum acceptable force, only magnetic guidance is used.

The invention also makes it possible to omit hydraulic means needed for lubricating such bearings or gaskets.

The undercarriage of the invention is thus less sensitive to wear.

Ideally, the first permanent magnet set is fastened directly to the first rod portion and the second permanent magnet set is likewise fastened directly to the second rod portion. This makes it possible to make the telescopic rod compact, while minimizing any need for interface parts in order to assemble a set of magnets with the corresponding rod portion.

In a particular embodiment of the invention, each of the magnets of the first permanent magnet set is incorporated in the first rod portion and each of the magnets of the second permanent magnet set is incorporated in the second rod portion.

This favors making the rod of the invention compact, since each magnet set is incorporated in the actual material of a rod portion.

In a particular embodiment of the invention, at least some of the magnets of the first permanent magnet set are arranged facing at least some of the magnets of the second permanent magnet set so as to generate magnetic torque opposing relative pivoting about the main axis of symmetry of the first rod portion relative to the second rod portion.

The permanent magnets of the first and second magnet sets are thus arranged to provide linear magnetic guidance allowing the first and second rod portions to slide relative to each other along the main axis of symmetry, while opposing relative rotation between these first and second rod portions relative to each other about the main axis of symmetry.

In this embodiment, because of the contactless magnetic means, the invention makes it possible to generate torque opposing relative pivoting between the first and second rod portions.

The fact of performing this function by using contactless magnetic means limits any need to implant mechanical guide parts such as a scissors linkage, or at very least makes it possible to use such a scissors linkage of smaller size. Any risk of the undercarriage malfunctioning as a result of wear in friction parts is thus minimized.

In a particular embodiment of the invention, said magnets of the first permanent magnet set that are arranged so as to generate said magnetic torque form branches of a star extending around the main axis of symmetry, and at least some of the magnets of the second permanent magnet set are arranged between some of the branches of the star to generate magnetic repulsion forces against the magnets of the first permanent magnet set forming the branches of the star.

The fact of interposing a permanent magnet carried by a sliding portion of the rod between two other permanent magnets that form branches of the star carried by the other sliding portion of the rod makes it possible to generate magnetic repulsion forces on either side of the magnet placed between the branches. These repulsion forces become balanced and encourage the magnet to be positioned in a neutral position at a distance from the two branches of the star. When this magnet departs from its neutral position, the unbalance between the repulsion forces tends to cause the magnet to return towards its neutral position between the branches of the star.

In a particular embodiment of the invention, the telescopic linear rod further comprises at least one first electromagnet adapted to generate a first axial repulsion force opposing relative approach between the first and second rod portions along a direction parallel to said main axis of symmetry of the rod.

In this embodiment, there is a magnetic repulsion effect that serves to act on the relative sliding between the first and second portions of the telescopic rod along the main axis of symmetry of the rod. This effect can be used to control extension or retraction of the telescopic rod and/or to control the damping of longitudinal compression forces on the rod, e.g. as appear during landing or while the aircraft is taxiing. This embodiment is useful for obtaining an undercarriage having a magnetic shock absorber.

In a particular embodiment that is combined with the preceding embodiment, electrical power supply means for powering said at least one first electromagnet are arranged to vary the electrical power supplied to said at least one first electromagnet so as to control relative sliding between said first and second rod portions.

Typically, by varying the power that is supplied, it is possible to move the equilibrium position between the rod portions and thus lengthen or shorten the rod. Furthermore, this variation in the electrical power that is supplied serves to change the damping characteristics and possibly also to control these characteristics while the aircraft is taxiing. It is thus possible to control the damping characteristics as a function of a parameter representing the load of the aircraft and/or a desired level of comfort and/or measurements representative of relative movements between the rod portions that slide relative to one another.

Said power supply means may be adapted to control at least one first electromagnet:
to extend or retract the telescopic linear rod by relative sliding between said first and second rod portions; and
to vary the damping characteristics of the relative movement between said first and second rod portions.

Sensors such as sensors for sensing axial compression forces of the rod and/or the positioning of the first and second rod portions relative to each other may be coupled to the power supply means, which can adjust the power supplied as a function of data picked up by at least some of the sensors. It is thus possible to control the electrical power supply so as to comply with a predetermined lengthening value for the rod and/or so as to control how axial shocks applied to the rod are absorbed.

In a particular embodiment of the invention, said at least one first electromagnet is assembled to one end of the first rod portion, and the undercarriage further comprises a second electromagnet assembled to one end of the second rod portion, these first and second electromagnets being placed facing each other and being adapted to act together to generate said axial repulsion force opposing said relative approach between the first and second rod portions.

It should be observed that when the first and second electromagnets are powered simultaneously so that the magnetic poles generated between the first and second electromagnets have the same one polarity sign (i.e. positive or negative), then repulsion is observed between the first and second electromagnets. This repulsion force that is oriented along the main axis of symmetry of the rod is used either to control extension of the undercarriage rod or to perform damping of axial compression forces on the rod acting along its main axis of symmetry.

In a particular embodiment of the invention, the undercarriage includes at least one rotation-control electromagnet arranged to control rotation about said main axis of symmetry of at least some of the first and second rod portions relative to the means attaching the rod to the main structure of the aircraft.

This embodiment makes it possible to steer the aircraft using electromagnetic means.

In this embodiment, a set of rotation permanent magnets may be arranged to co-operate with said at least one rotation-control electromagnet to control said rotation, this set of rotation permanent magnets may be incorporated in at least one of the first and second rod portions or in a stationary casing surrounding the rod over at least a fraction of its length.

The fact of incorporating the set of rotation permanent magnets in the rod makes it possible to make the undercarriage compact, since steering is driven directly on the rod without requiring an intermediate mechanism for transmitting mechanical forces from an electromagnetic actuator to the rod.

BRIEF DESCRIPTION OF THE FIGURES

The invention can be better understood in the light of the following description of particular non-limiting embodiments of the invention given with reference to the figures of the accompanying drawings, in which:

FIGS. 1a, 1b, 1c, and 1d show component elements of the undercarriage rod 0 in a first embodiment of the invention, which is shown assembled ion FIG. 1h;

FIG. 1f shows a step of assembling the undercarriage rod of FIG. 1h in which a second portion 2 of the rod is inserted in an internal recess of the first portion 1 of the rod in order to slide therein while conserving an annular space E1 all around the second rod portion, between the first and second portions 1 and 2 of the rod;

FIG. 1g shows another step of assembling together portions 3 and 4 of the undercarriage rod of FIG. 1h, in which a fourth portion 4 of the telescopic rod is placed inside a tubular third portion 3 of the telescopic rod in order to slide therein without touching because of the existence of another annular space E2 extending all around the fourth portion 4 and between the third and fourth portions 3 and 4;

FIG. 1h is a view showing the telescopic rod in a first embodiment of the invention when assembled, in which the empty annular spaces E1 and E2 are maintained by using concentric magnetic repulsion forces around the axis of symmetry X-X of the rod;

FIG. 10c shows a telescopic fourth portion 4 of the rod 0 shown in FIG. 1h, this fourth portion 4 carries a wheel axle 5 of the undercarriage situated at the second end 31 of the rod 0, in this FIG. 10c there can be seen a cross-section D-D of the fourth rod portion 4 on which magnets of a set of permanent magnets carried by the fourth rod portion 4 are in a star arrangement in order to generate magnetic repulsion forces for centering this fourth rod portion 4 relative to at least one of the other portions 1, 2, and 3 of the telescopic rod 0, this centering being performed around the main axis of symmetry X-X of the rod, while opposing relative rotation between the fourth rod portion 4 and the other rod portions 1, 2, and 3;

FIG. 10d shows the third portion 3 of the telescopic rod 0 of FIG. 1h, as can be seen in cross-sections C-C and C'-C', this third rod portion 3 is in the form of a tube carrying internally an internal set 3a of internal permanent magnets having polarities oriented to generate repulsion forces on this third rod portion 3 relative to the fourth rod portion 4 that slides in the third rod portion 3, and also magnetic repulsion forces between the third portion 3 and the second portion 2 which also slides in the third portion 3, the third rod portion 3 also carrying a set 3b of external permanent magnets arranged to guide the sliding of the third portion 3 relative to the first rod portion 1 in which it slides, these internal and external sets 3a and 3b of permanent magnets being arranged to oppose pivoting of the third rod portion 3 relative to the first, second, and fourth portions 1, 2, and 4;

FIG. 2b shows a first portion 1' of the rod 0' shown in FIG. 2a, the cross-section view E-E shows a first set 1a' of permanent magnets in a star arrangement for using magnetic repulsion to guide a second portion 2' of the rod 0', which slides inside the first portion 1' of the rod 0', the magnetic repulsion exerted by the first set 1a' of magnets being designed to oppose relative rotation between the first portion 1' and the second portion 2', while guiding linear and contactless relative sliding between the portions 1' and 2';

FIG. 2c shows the second portion 2' of the rod 0' shown in FIG. 2a, this second portion 2' being in the form of a tube arranged to slide without pivoting inside the first portion 1 and to remain centered inside the first portion 1' without touching as a result of magnetic repulsion;

FIG. 2d shows the third portion 3' of the rod 0' shown in FIG. 2a, this third portion 3' being in the form of a tube arranged to slide without pivoting inside the second portion 2' and to remain centered inside the second portion 2' without touching it as a result of magnetic repulsion;

FIG. 2e shows the fourth portion 4' of the rod 0' shown in FIG. 2a, this fourth portion being arranged to slide without pivoting inside the third portion 3' and to remain centered inside the third portion 3' without touching it, as a result of magnetic repulsion, the third portion 3' forming a second end 31' of the rod 0' for carrying the wheel axle 5';

DETAILED DESCRIPTION OF THE INVENTION

Figure 2A:
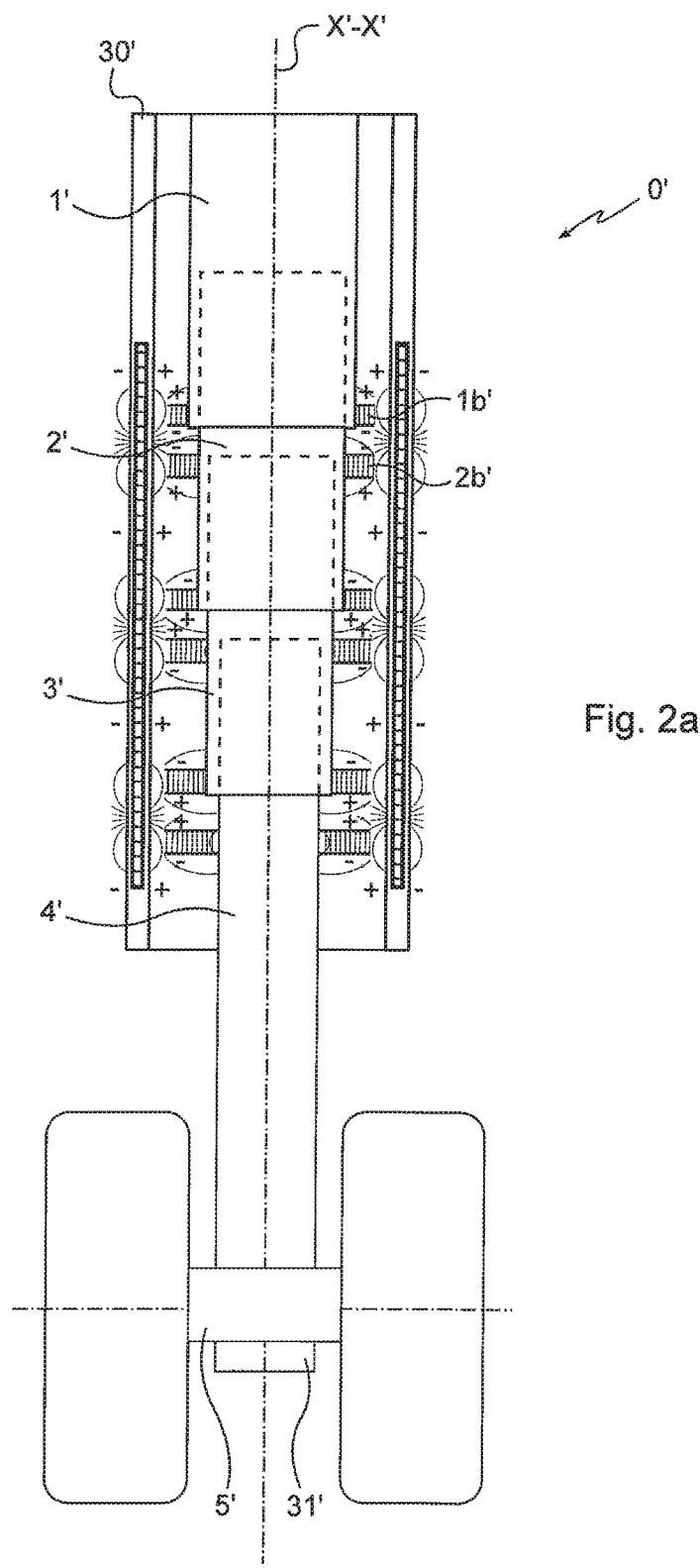
FIG. 2a shows the linear telescopic undercarriage rod 0' in a second embodiment of the invention, in this example the rod 0' has four telescopic portions 1', 2', 3', and 4' sliding in pairs without contact as a result of magnetic repulsion forces that center these rod portions 1', 2', 3', and 4' about a main axis of symmetry X'-X' of the rod 0'.

As mentioned above, the invention relates to a linear telescopic aircraft undercarriage rod 0, 0', 0". The rod is made up of a plurality of rod portions slidably mounted relative to one another in order to enable the rod to be extended or retracted by relative sliding between the rod portions along a main axis of symmetry X-X, X'-X', X"-X" of the rod.

In the first embodiment shown in FIGS. 1a to 10c, the first rod portion 1 carries the first end 30 of the rod 0 that is to be assembled to a structure of the aircraft. This first rod portion 1 is in the form of a hollow tube of axis X-X for allowing a second rod portion 2 to pass and slide inside the first portion 1. A first set 1a of permanent magnets is incorporated in the first portion 1. These magnets are regularly arranged all around the first portion 1. Each of these magnets presents polarity of a first sign, specifically positive, oriented towards the inside of the first rod portion, and a plurality of a second sign opposite to the first, specifically negative, that is oriented towards the outside of the first rod portion 1.

The second rod portion 2 is in the form of a double piston, i.e. it is an elongate part having opposite ends, each forming a respective piston head. This second portion 2 carries a second set 2a of permanent magnets incorporated in the second portion 2. These magnets are regularly arranged all around the second portion 2. Each of these magnets presents a plurality of said first sign that is oriented towards the outside of the second portion 2 and a plurality of said second sign that is oriented towards the inside of the second portion 2.

Thus, when the second rod portion 2 is inserted in the first portion 1 in order to slide therealong, the magnets of the first and second sets 1a and 2a have their poles opposing one another, thereby forcing the portions 1 and 2 to remain spaced apart from each other and separated by an annular space E1. Linear guidance is thus provided without friction between these two portions 1 and 2.

Figure 3A:
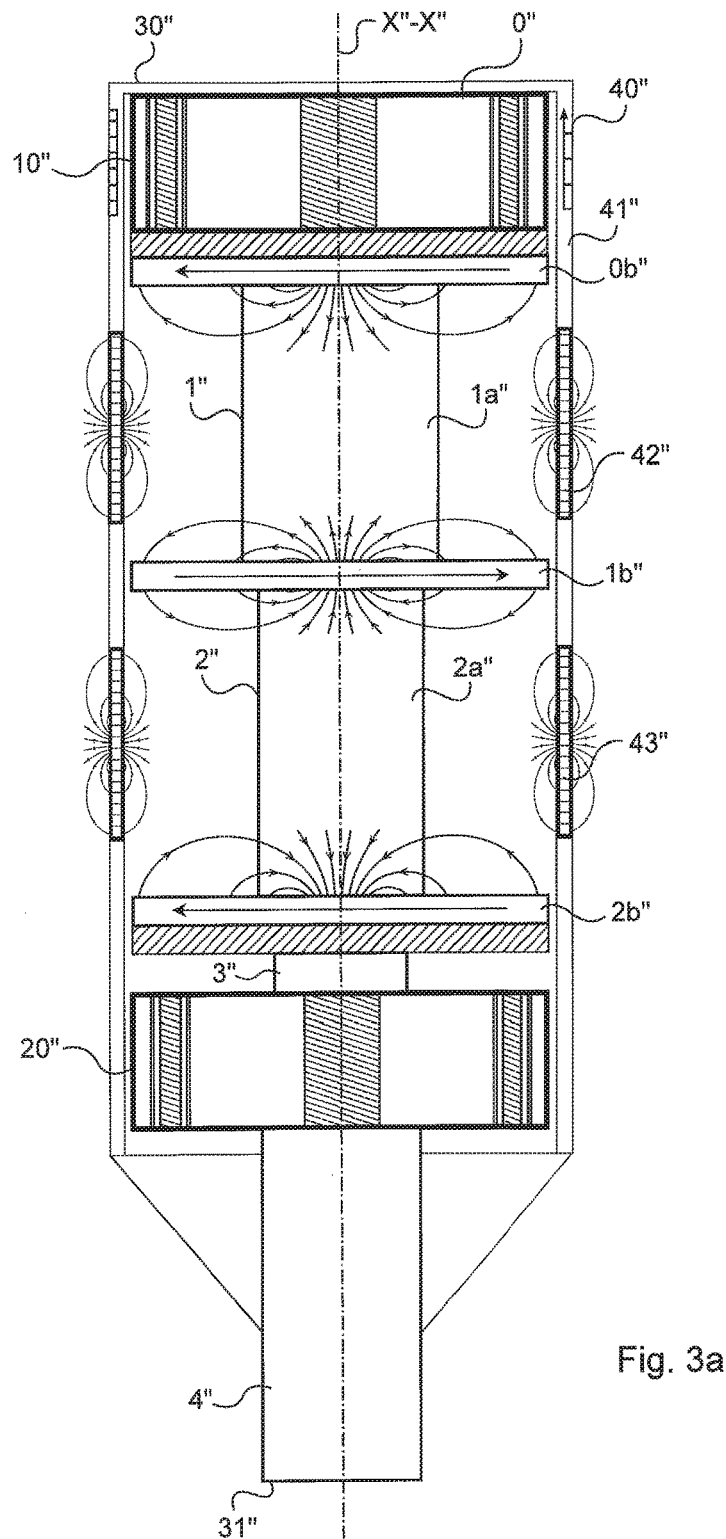
FIG. 3a shows a linear telescopic undercarriage rod 0" in a third embodiment of the invention, in this example the rod 0" has three telescopic portions 1", 2", 3" sliding in pairs without contact as a result of magnetic repulsion forces centering these rod portions 1", 2", 3" about a main axis of symmetry X"-X" of the rod 0", in this embodiment a first rotation-control electromagnetic 10" is incorporated in the first rod portion 1" to cause it to turn about its axis of symmetry X"-X" relative to an aircraft structure (not shown), and a second rotation-control electromagnet 20" is incorporated in a terminal fourth portion 4" of the rod in order to cause the fourth portion 4" to turn relative to the third rod portion 3"

In each of the embodiments of FIGS. 1h, 2a, and 3a, the linear guidance between adjacent rod portions is provided by the same principle of magnetic repulsion forces. Thus, each rod portion carries at least one set of permanent magnets provided so as to generate repulsion forces relative to another set of permanent magnets carried by another one of the portions of the rod.

Figure 10A:
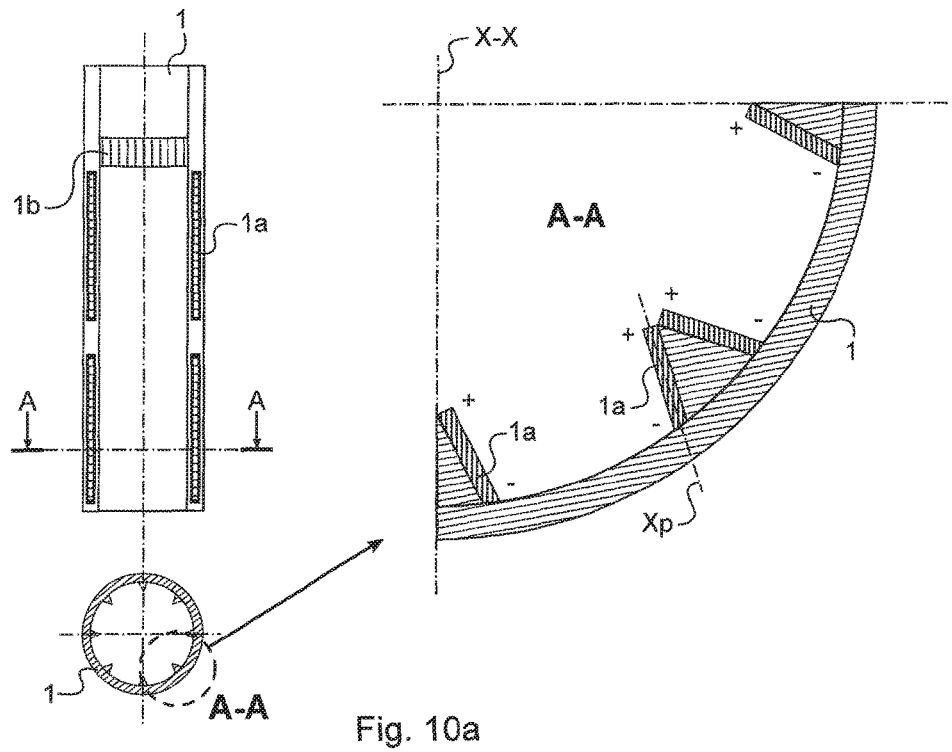
FIG. 10a shows the first portion 1 of the telescopic rod 0 shown in FIG. 1a, and in FIG. 10a there can be seen a cross-section A-A of a tubular zone of the first portion 1, showing a star arrangement of magnets in a first set 1a of permanent magnets for generating magnetic repulsion forces.
Figure 10B:
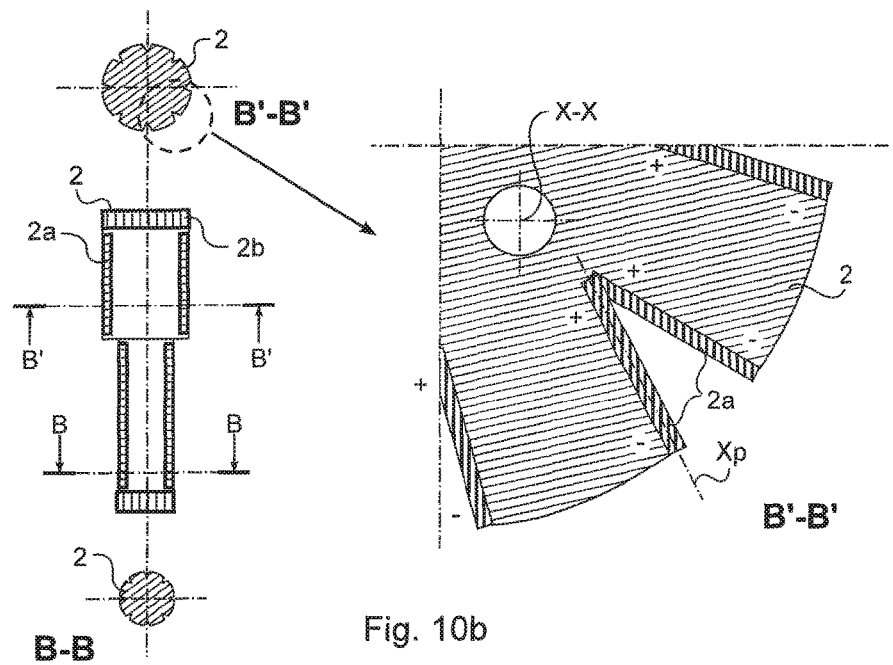
FIG. 10b shows the second portion 2 of the telescopic rod 0 already shown in FIG. 1b, this second portion 2 of the rod 0 being shaped to be capable of sliding inside the first portion 1 of the rod 0, and in FIG. 10b there can be seen a section view on a plane B'-B' showing a star arrangement of the magnets of the second set 2a of permanent magnets, which are arranged respectively to come into register with the magnets of the first set 1a of permanent magnets so as to generate magnetic repulsion forces in order to maintain an empty annular space E1 all around the second portion 2 and between these portions 1 and 2, thereby making it possible firstly to guide linear sliding of the portions 1 and 2 relative to each other, and secondly to oppose relative pivoting between these portions 1 and 2.

As can be seen in particular in FIG. 10a in the section A-A, in FIG. 10b in the section B'-B', in FIG. 2b in the section E-E, and in FIG. 2e in the section F-F, some of the permanent magnets of the two sets of permanent magnets that are arranged to generate repulsion forces in order to center the rod portions relative to one another about the axis X-X are in a star arrangement with branches extending around the main axis of symmetry X-X. Thus, a magnet of a given set may lie between two star branches formed by magnets of another given set of permanent magnets. In such an arrangement, the repulsion forces between the magnets of the sets are such as to force the magnets placed between the branches to remain in a stable position and at a distance from the magnets forming the two branches. This provides a magnetic return torque opposing pivoting of the rod portions relative to one another. This contactless magnetic guidance between the rod portions opposes twisting of the rod about its main axis of symmetry X-X.

In the sections A-A, B'-B', E-E, and F-F of FIGS. 10a, 10b, 2b, and 2e, it can be seen that the permanent magnets of the sets of magnets have their main polar axes Xp oriented in planes perpendicular to the main axis of symmetry X-X, X'-X' of the telescopic rod. In order to generate magnetic torque opposing relative pivoting between the rod portions while maintaining these portions at a distance from one another, the axes Xp may either be oriented substantially radially or else substantially tangentially relative to the axis of symmetry of the rod.

Thus, the first space E1 between the first and second rod portions 1 and 2 is maintained by the magnetic repulsion forces exerted between the first and second sets 1a and 2a of magnets. This space E1 limits any risk of mechanical contact between the first and second portions. The need for lubrication between the rod portions can thus be limited and the weight and the bulk of the rod can be small.

This annular space E1 extends facing the entire facing zone between the first and second portions of the telescopic rod. When observed along the main axis of symmetry of the rod, this space E1 is star-shaped.

In another aspect of the invention, used in each of the embodiments of the invention shown in FIGS. 1h, 2a, and 3a, at least some of the rod portions carry a respective electromagnet adapted to generate an axial repulsion force that opposes two adjacent rod portions approaching each other in an approach direction parallel to said main axis of symmetry X-X, X'-X, X"-X" of the rod.

Such an electromagnet 1b, 1b', 1b", 2b, 2b', 2b" may be fastened on a rod in order to cause permanent magnets assembled on another rod to be magnetically repelled along the main axis of symmetry X-X, X'-X', X"-X".

As can be seen in particular in FIGS. 1h, 2a, and 3a, it is possible to have an electromagnet 1b fastened at one end of a rod portion 1 and another electromagnet 2b fastened at one end of another rod portion, these electromagnets forming a pair of electromagnets placed facing each other in order to generate axial repulsion or attraction forces between the electromagnets.

A single undercarriage rod may have a plurality of pairs of electromagnets, each of these pairs being adapted to generate an axial repulsion force and/or an axial attraction force for causing the rod to extend and/or retract, and possibly also for adjusting damping relationships when the rod is subjected to axial compression forces.

Thus, in the embodiment of FIG. 1h:

there is a first pair of electromagnets formed by the electromagnet 1b carried by the first rod portion 1 and by the electromagnet 2b carried at one end of the second rod portion 2; and there is a second pair of electromagnets 2c and 4b formed between one end of the second rod portion 2 and one end of the fourth rod portion 4.

The presence of two pairs of electromagnets for generating magnetic forces along the main axis of symmetry of the rod provides redundancy in the damping function controlled by electromagnetic forces.

In the embodiment of FIG. 2a, each end of the sliding portions of the rod carries an electromagnet, these electromagnets thus forming a plurality of pairs of electromagnets, specifically three pairs, each enabling action to be taken on extending and/or retracting the rod between its ends 30' and 31'.

In the embodiment of FIG. 3a, there is a stationary first electromagnet 0b" assembled on an axially stationary portion of the rod 0", a second electromagnet 1b" mounted at an end of the first rod portion 1" that is distal relative to the electromagnet 0b", and a third electromagnet 2b" mounted at an end of the second rod portion 2" that is distal relative to the electromagnet 1b".

These electromagnets 0b", 1b", and 2b" are arranged to act in pairs to generate repulsion or attraction forces for controlling the extension or the retraction of the rod.

Ideally, in each of the embodiments of FIGS. 1h, 2a, and 3a, axial thrust permanent magnets may be assembled at one end of the first rod portion 1, 1', 1" and/or at one end of the second rod portion 2, 2', 2", and so on, so as to generate a second axial repulsion force that opposes relative approach between the first and second rod portions. Since these magnets are permanent magnets, this second force can be generated therein even in the absence of any electrical power supply to the first electromagnet 1b, 1b', 1b" or to the second electromagnet 2b, 2b', 2b". This second repulsion force provides safety in the event of an electrical failure so as to conserve some minimum axial distance between the first and second portions of the telescopic rod and thus provide some minimum level of damping. Unlike the first axial repulsion force that is generated by the electromagnets and that can be controlled actively, this second force acts solely to increase the reaction to retraction of the telescopic rod.

It should also be observed that at least some of the electromagnets arranged for controlling extension and/or retraction of the rod may include poles that are oriented radially in order to be able to generate radial repulsion forces, e.g. in order to oppose any risk of the rod portions that slide one in another coming radially into contact. Such poles, positive in this example, are symbolized in FIG. 1b at the end 2c of the rod 2.

As shown in FIG. 3a, electromagnets 40", 42", and 43" may be fastened on a stationary casing 41" surrounding the rod. By way of example, these electromagnets may interact with the poles of the electromagnets that are oriented radially so as to generate said radial repulsion forces.

Figure 3B:
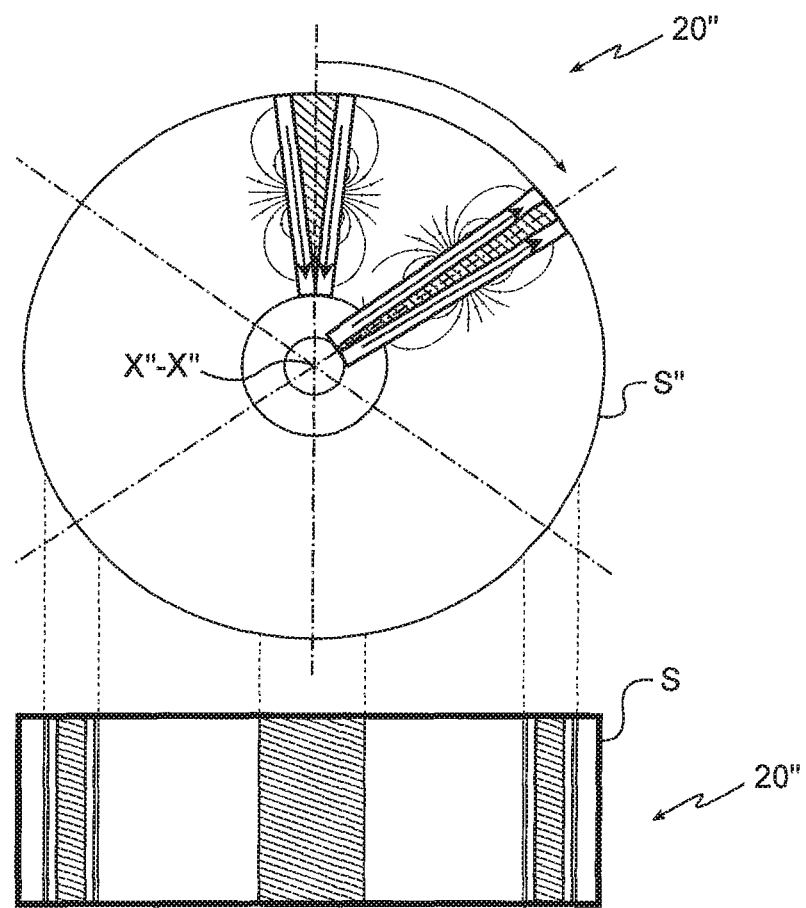
FIG. 3b is a cross-section view and a longitudinal section view of the second rotation-control electromagnet 20", which is similar to the first electromagnet 10" in that it presents radial electromagnetic poles incorporated in the rod in order to cause it to pivot as a function of the electrical power supply delivered to the rotation-control electromagnet.

As shown in the embodiment of FIG. 3a, the undercarriage rod may also include at least one rotation-control electromagnet, and specifically it includes two rotation-control electromagnets 10" and 20". Each of these electromagnets controls rotation about said main axis of symmetry X"-X" of at least some of the rod portions 1", 2", 3", 4" relative to the means for attaching the rod to the main structure of the aircraft. As can be seen in FIG. 3b, a rotation-control electromagnet comprises a plurality of magnetic poles arranged along an annular surface S" centered about the axis of symmetry X"-X" of the rod. These magnetic poles are arranged with alternating signs around the annular surface S".

At least one set of rotation permanent magnets 40" is arranged to co-operate with at least one of the rotation-control electromagnets 10" in order to control said rotation.

Two other sets of rotation permanent magnets 42", 43" may also be assembled further and further along the stationary casing 41".

As mentioned above, in this example, these various sets of rotation permanent magnets 40", 42", 43" are assembled along the stationary casing 41". These various sets of rotation permanent magnets 40", 42", 43" form an alternation of polarities extending along the inside periphery of the stationary casing 41".

Thus, at least some of the poles positioned along the annular surfaces S" of the rotation-control electromagnets 10" or 20" may be attracted or repelled towards or away from magnetic poles of the sets of rotation permanent magnets 40", 42", 43". By varying the electrical power supply to each of the rotation-control electromagnets 10", 20", it is thus possible to turn rod portions about the axis of symmetry X"-X", and where necessary to block the rod in a given orientation in order to steer the aircraft on the ground.

Although the use of rotation-control electromagnets 10", 20" is described only for the embodiment of FIG. 3a, such rotation-control electromagnets and rotation control permanent magnets can naturally be combined in each of the other embodiments of the invention in order to control rotation about the axis of symmetry of portions of the rod relative to the structure of the aircraft.

The electrical power supply to the various electromagnets carried by the sliding rods can be provided via connecting brushes that slide along conductor tracks extending along the rod. These conductor tracks may be formed at the surfaces of at least some of the rod portions and they may extend along the rod and/or around the rod. At least some of these conductor tracks may be formed by printing using a conductor ink or by electrolytically depositing an electrically conductive material, or by a layer of grains of conductive material projected at high velocity.

It should be observed that in order to improve the transfer of electricity, some of the conductive materials used may be superconductors.

The invention is naturally not limited to the above description, but covers any variant coming within the ambit defined by the claims, together with other variants.

In particular, a rotation-control electromagnet 10", 20" of the above-defined type may be used for steering a conventional undercarriage rod while the rod portions are guided linearly not by magnetic repulsion forces but rather by conventional means with friction against bearing surfaces of mechanical bearings distributed along the rod.

It should be observed that although the rotation-control electromagnet is described as being carried by the rod, it is also possible for it to be carried by the stationary casing. In such an embodiment, a set of rotation permanent magnets may be arranged to co-operate with said at least one rotation-control electromagnet carried by the stationary casing so as to control rotation of the rod.

This embodiment makes it possible to generate rotary forces on the rod via magnets implanted directly in the rod, and it is thus possible to omit mechanical force transmission means between an electromagnetic actuator external to the rod and the portion of the rod that is to be actuated.

Likewise, even though the above-described embodiments all have a first set of permanent magnets assembled to the first rod portion and a second set of permanent magnets assembled to the second rod portion, it is possible that in addition to the second set of permanent magnets or as a replacement for the second set of permanent magnets to have at least one radial repulsion electromagnet arranged, when powered electrically, to exert a radial repulsion force relative to the magnets of the first set of permanent magnets so as to guide sliding between the first and second portions of the rod while maintaining the annular space between the first and second portions of the rod.

This solution is applicable for guiding sliding of any portion of the rod relative to another portion of the rod.

Furthermore, it should be observed that at least some of the permanent magnets or electromagnets described in the various embodiments of the invention may be assembled to the corresponding rod portion or to the corresponding casing either by being inserted therein or else by means of a harness.

The invention claimed is:

1. An aircraft undercarriage including a telescopic linear rod (0, 0', 0") extending between a first rod end (30, 30', 30") having means for attaching the rod to a main structure of the aircraft and a second rod end (31, 31', 31") carrying a wheel axle (5, 5') of the undercarriage, the telescopic linear rod (0, 0', 0") comprising rod portions (1, 2, 3, 4, 1', 2', 3', 4', 1", 2", 3", 4") adapted to slide in one another along a main axis of symmetry (X-X, X'-X', X"-X") of the rod in order to extend or retract the telescopic rod, the undercarriage comprising:
a first permanent magnet set (1a, 1a', 1a") fastened to a first of said rod portions (1, 1', 1"); and
a second permanent magnet set (2a, 2a', 2a") fastened to a second of said rod portions (2, 2', 2");
the first and second permanent magnet sets (1a, 1a', 1a", 2a, 2a', 2a") are arranged so as to generate a magnetic repulsion force between the first rod portion (1, 1', 1") and the second rod portion (2, 2', 2") and to maintain a first annular space (E1) extending around one of the first or second rod portions and situated between the first rod portion and the second rod portion;
at least some of the magnets of the first permanent magnet set (1a, 1a', 1a") are:
arranged facing at least some of the magnets of the second permanent magnet set (2a, 2a', 2a") so as to generate magnetic torque opposing relative pivoting about the main axis of symmetry (X-X, X'-X', X"-X") of the first rod portion (1, 1', 1") relative to the second rod portion (2, 2', 2"); and
arranged to form branches of a star extending around the main axis of symmetry (X-X, X'-X', X"-X"); and wherein
at least some of the magnets of the second permanent magnet set (2a, 2a', 2a") are arranged between some of the branches of the star to generate magnetic repulsion forces against the magnets of the first permanent magnet set forming the branches of the star.

2. The undercarriage according to claim 1, wherein each of the magnets of the first permanent magnet set (1a, 1a', 1a") is incorporated in the first rod portion (1, 1', 1") and each of the magnets of the second permanent magnet set (2a, 2a', 2a") is incorporated in the second rod portion (2, 2', 2").

3. The undercarriage according to claim 1, wherein the telescopic linear rod further comprises at least one first electromagnet (1b, 1b', 1b") that generates a first axial repulsion force opposing relative approach between the first and second rod portions (1, 2, 1', 2', 1", 2") along a direction parallel to said main axis of symmetry (X-X, X'-X', X"-X") of the rod.

4. The undercarriage according to claim 3, further comprising electrical power supply means for powering said at least one first electromagnet, the power supply means is arranged to vary the electrical power supplied to said at least one first electromagnet so as to control relative sliding between said first and second rod portions.

5. The undercarriage according to claim 4, wherein said power supply means are adapted to control at least one first electromagnet (1*b*, 1*b*', 1*b*"):

to extend or retract the telescopic linear rod by relative sliding between said first and second rod portions; and to vary the damping characteristics of the relative movement between said first and second rod portions.

6. The undercarriage according to claim 4, wherein said at least one first electromagnet (1*b*, 1*b*', 1*b*") is assembled to one end of the first rod portion (1, 1', 1"), and the undercarriage further comprises a second electromagnet (2*b*, 2*b*', 2*b*") assembled to one end of the second rod portion (2, 2', 2"), these first and second electromagnets being are placed facing each other and act together to generate said axial repulsion force opposing said relative approach between the first and second rod portions.

7. The undercarriage according to claim 1, including at least one rotation-control electromagnet (10", 20") arranged to control rotation about said main axis of symmetry (X"-X") of at least some of the first and second rod portions (1", 2", 3", 4") relative to the means attaching the rod to the main structure of the aircraft.

8. The undercarriage according to claim 7, wherein a set of rotation permanent magnets (40") is arranged to co-operate with said at least one rotation-control electromagnet (10") to control said rotation, said set of rotation permanent magnets is placeable facing magnetic poles of said at least one rotation-control electromagnet (10") and is capable of assembly to a stationary casing (41") surrounding the telescopic rod (0") over at least a fraction of a length of said rod.

* * * * *